United States Patent [19]

Baurmeister et al.

[11] Patent Number: 4,724,900

[45] Date of Patent: Feb. 16, 1988

[54] APPARATUS FOR EFFECTING MASS AND/OR HEAT TRANSFER

[75] Inventors: Ulrich Baurmeister, Wuppertal; Werner Sticksel, Seligenstadt; Elmar Hoff, Hattingen, all of Fed. Rep. of Germany

[73] Assignee: Akzo NV, Arnhem, Netherlands

[21] Appl. No.: 856,370

[22] Filed: Apr. 28, 1986

[30] Foreign Application Priority Data

| Apr. 27, 1985 [DE] | Fed. Rep. of Germany | 3515279 |
|---|---|---|
| Sep. 28, 1985 [DE] | Fed. Rep. of Germany | 3534618 |
| Oct. 3, 1985 [DE] | Fed. Rep. of Germany | 3535386 |
| Apr. 7, 1986 [DE] | Fed. Rep. of Germany | 3611621 |

[51] Int. Cl.$^4$ ................................. F28D 7/00
[52] U.S. Cl. .................... 165/76; 165/159; 210/321.89
[58] Field of Search .............. 165/76, 158, 159; 210/321.1–321.4, 323.2

[56] References Cited

U.S. PATENT DOCUMENTS

| 2,153,361 | 4/1939 | Bennett | 165/147 X |
|---|---|---|---|
| 3,315,740 | 4/1967 | Withers | 165/46 |
| 4,098,852 | 7/1978 | Christen et al. | 165/173 X |
| 4,187,180 | 2/1980 | Joh | 210/321.1 |
| 4,211,597 | 7/1980 | Lipps et al. | 210/321.1 X |
| 4,216,687 | 1/1981 | Nolf . | |
| 4,463,802 | 8/1984 | Villeval . | |
| 4,506,728 | 3/1985 | Gentry | 165/159 X |
| 4,605,500 | 8/1986 | Takemura et al. | 210/321.1 |

FOREIGN PATENT DOCUMENTS

| 0045213 | 2/1982 | European Pat. Off. . |
|---|---|---|
| 0079245 | 5/1983 | European Pat. Off. . |
| 1544107 | 7/1970 | Fed. Rep. of Germany . |
| 1959394 | 7/1970 | Fed. Rep. of Germany . |
| 2036398 | 2/1971 | Fed. Rep. of Germany . |
| 2353419 | 4/1975 | Fed. Rep. of Germany . |
| 2509717 | 9/1976 | Fed. Rep. of Germany . |
| 2733280 | 1/1978 | Fed. Rep. of Germany . |
| 2744855 | 4/1978 | Fed. Rep. of Germany . |
| 2824934 | 12/1978 | Fed. Rep. of Germany . |
| 2735450 | 2/1979 | Fed. Rep. of Germany . |
| 2910214 | 9/1979 | Fed. Rep. of Germany . |
| 2818946 | 11/1979 | Fed. Rep. of Germany . |
| 3023681 | 2/1981 | Fed. Rep. of Germany . |
| 3039307 | 4/1981 | Fed. Rep. of Germany . |
| 2944172 | 5/1981 | Fed. Rep. of Germany . |
| 3039336 | 5/1981 | Fed. Rep. of Germany . |
| 3016636 | 11/1981 | Fed. Rep. of Germany . |
| 3032417 | 4/1982 | Fed. Rep. of Germany . |
| 3409000 | 9/1984 | Fed. Rep. of Germany . |
| 2267138 | 11/1975 | France . |
| 2369912 | 6/1978 | France . |
| 2084505 | 4/1982 | United Kingdom . |

OTHER PUBLICATIONS

Patent Office Gazette, HEFT 24, Jun. 16, 1977, p. 975.
Kleinheins et al., "Besonderheiten bei der Qualitatssicherung Strahlungsvernetzter Warmeschrumpferzeugnisse", *Kunststoffe*, 74 (1984), 8, pp. 445–449.

*Primary Examiner*—Albert W. Davis, Jr.
*Assistant Examiner*—Richard R. Cole
*Attorney, Agent, or Firm*—Parkhurst & Oliff

[57] ABSTRACT

An apparatus for effecting mass and/or heat transfer, comprising a bundle of hollow filaments of substantially equal length, the ends of which are embedded in a sealing compound, a substantially cylindrical housing with connecting branches for the supply and removal of at least two media, the first medium being guided through the hollow filaments and the second medium being guided radially inwardly at the flow inlet of the housing and radially outwardly at the flow outlet, the housing comprising a substantially tubular body and two caps. The connecting branches are disposed in the caps. Each cap forms with the ends of the substantially tubular body two distributor chambers, the first of which is disposed on the end face and the second on the outside jacket of the tubular body. The outside jacket of the tubular body has at least one port in the area of the second distributor chamber. The interior of the substantially tubular body may widen conically from one end area to the other. Preferably, the substantially tubular body has substantially the same linear-change characteristics as the bundle of hollow filaments. The mass-transfer units can be suitably used as dialyzers, in which case the caps can remain fixed in a dialysis system. Methods suitable for manufacturing the apparatus for effecting mass and/or heat transfer are also disclosed.

6 Claims, 17 Drawing Figures

APPARATUS FOR EFFECTING MASS AND/OR HEAT TRANSFER

FIELD OF THE INVENTION

The invention relates to an apparatus for effecting mass and/or heat transfer and to methods for manufacturing such apparatus.

SUMMARY OF THE INVENTION

The apparatus of the invention comprises a bundle of hollow filaments of substantially equal length, the ends of which are embedded in a sealing compound, a substantially cylindrical housing with connecting branches for the supply and removal of at least two media, the first medium being guided through the hollow filaments and the second medium being guided radially outward at the flow outlet of the housing, wherein the housing comprises a substantially tubular body and two caps. The invention also relates to suitable methods for manufacturing the disclosed apparatus for effecting mass and/or heat transfer.

It is an object of the present invention to provide an apparatus for effecting mass and/or heat transfer of the above type which is suitable for a partly or fully automatic manufacturing process. Furthermore, a maximum number of the component parts of the apparatus for effecting mass and/or heat transfer are reusable. Preferably, the apparatus for effecting mass and/or heat transfer contains a minimum proportion of sealing compound.

The tubular body can be altered in its external dimensions without incurring high expenditures for tools, because no connecting branches need to be provided therein.

In the simplest case, a single port suffices, which can then be considered as a direct extension of the connecting branch. As a rule, however, a plurality of ports are provided. They are to be disposed as close as possible to the sealing compound.

The bundle of hollow filaments may comprise either individual filaments or filaments that are joined together, e.g., woven into weft threads. The hollow filaments may also be assembled together into a bundle around a stabilizing core.

The tubular body no longer needs to be particularly stable, i.e., it may have a very thin wall or a flexible construction.

The caps (as a disposable item) may be securely joined to the tubular body. However, they may also be removably joined thereto. In that case, they can also be reused when replacing the tubular body; they may even be a component part of the systems provided for the apparatus for effecting mass and/or heat transfer, in which case only the tubular body with the bundle of hollow filaments must be replaced.

It is particularly advantageous to place the second distributor chamber (for the second medium) circumferentially about the outside of the tubular body and to provide for a plurality of ports along the circumference of the outside of the tubular body. A particular advantage is achieved by a special formation of the annular cross section of the second distributor chamber, by providing ports with different cross-sectional areas and/or by a special distribution of the ports along the circumference of the tubular body so as to bring about a uniform impact of the second medium (supply or removal thereof) on the circumference of the bundle of hollow filaments. If there is a difference between the cross-sectional areas of the ports, the largest opening, which of course is diametrically opposed to the connecting branch, can be used for the introduction of the sealing compound.

The ports will, as a rule, pass radially through the wall of the tubular body, but given an appropriate annular formation of the tube wall, they can also pass axially through the annular duct formed. It is also of advantage if the inside wall of the ends of the substantially tubular body, in the area of the sealing compound, has a cross-sectional area so enlarged that between the outside circumference of the bundle of hollow filaments and the inside wall of the tubular body there is a minimum of intervening space filled with sealing compound. Preferably, the radial dimension of the intervening space should range from 0.2 to 1.5 mm.

Advantageously, the interior of the substantially tubular body widens conically from one end region to the other. In this way, it is possible to protect the substantially parallel sided bundle of hollow filaments from almost any damage during its axial insertion as it is being introduced into the narrowest part of the tubular body possibly by means of an auxiliary device, e.g. a funnel. In this case, the conicity is approximately 0.5° to 1°, measured between the wall and the axis of the tubular body.

Advantageously, the caps and the substantially tubular body are composed of different materials, and the material of which the tubular body is made has substantially the same linear-change characteristics as the bundle of hollow filaments. It is also possible to vary the linear-change characteristics by a physical design of the tubular body, for instance, as a folding bellows.

Recesses or projections may be provided on the tubular body to facilitate handling. Likewise, the position of the cap relative to the tubular body can be accurately fixed by appropriate boss-like projections or bulges.

Another object of the present invention is to provide suitable methods for manufacturing the apparatus for effecting mass and/or heat transfer of the invention, which can also be integrated into a fully continuous manufacturing process and which in particular avoids sealing problems that frequently occur.

This object is achieved with a method in which a bundle of hollow filaments is axially inserted into a housing and is sealed off at both ends with a sealing compound. This method is characterized by the use of a tubular housing, both ends of which are enlarged as slightly as possible, wherein there is mounted on each of the enlarged ends of the housing an annular body which, at its free end, corresponds in its inside dimension to the outside contour of the bundle of hollow filaments and then passes from said inside dimension initially into the inside contour of the enlarged end of the housing. The ends of the inserted bundle of hollow filaments are so tightly embedded in a sealing compound that the sealing compound fills the free space in the annular body and at least partly in the enlarged end of the housing. After the sealing compound has set, the annular body is removed, and thereafter the protruding end of the hollow filament bundle, assembled together with sealing compound, is cut off outside the housing in the area in which the outside cross section of the sealing compound is larger than the outside cross section of the bundle of hollow filaments.

This method has the following advantages:

ravelling of the hollow filaments, which otherwise is the norm, is prevented;

manufacture of the hollow-filament modules can be automated;

intimate contact between the sealing compound and the end of the housing in the finished modular unit can be assured;

a particularly effective sealing face, integrated into the surface of the sealing compound, is achieved in the area of the enlargement of the cross section of the sealing compound.

Another object of the invention is achieved with a method in which a bundle of hollow filaments is radially inserted into a housing and sealed off at both ends with sealing compound. In this method, the bundle of hollow filaments with the support element is placed in a flexible, axially slit and bent-up tube, and the tube is then brought into the desired closed form and joined at the axial line of separation.

Finally, another object of the invention is achieved with a method in which a bundle of hollow filaments is axially inserted into a housing. In this method, a bundle of hollow filaments, from twice to many times the length of the bundle in the finished transfer units, is inserted into a multiple housing of the same length. The multiple housing has wall openings for the supply and removal of transfer media in the areas provided as end sections of the housing. The housing, with the bundle of hollow filaments located therein, is then cut into transfer units for effecting mass and/or heat transfer of a desired length, and the end sections of the hollow filaments are then sealed off with a sealing compound in the areas between the cutting points and the wall openings.

These methods embodying the invention are also suitable for manufacturing exchangers in which not all connecting branches are disposed in the caps; in which, by way of example, only one connecting branch is disposed in each cap.

BRIEF DESCRIPTION OF THE DRAWINGS

The invention will now be described in greater detail with reference to the accompanying drawings, in which are shown in.

DETAILED DESCRIPTION OF PREFERRED EMBODIMENTS OF THE INVENTION

Figure 1:
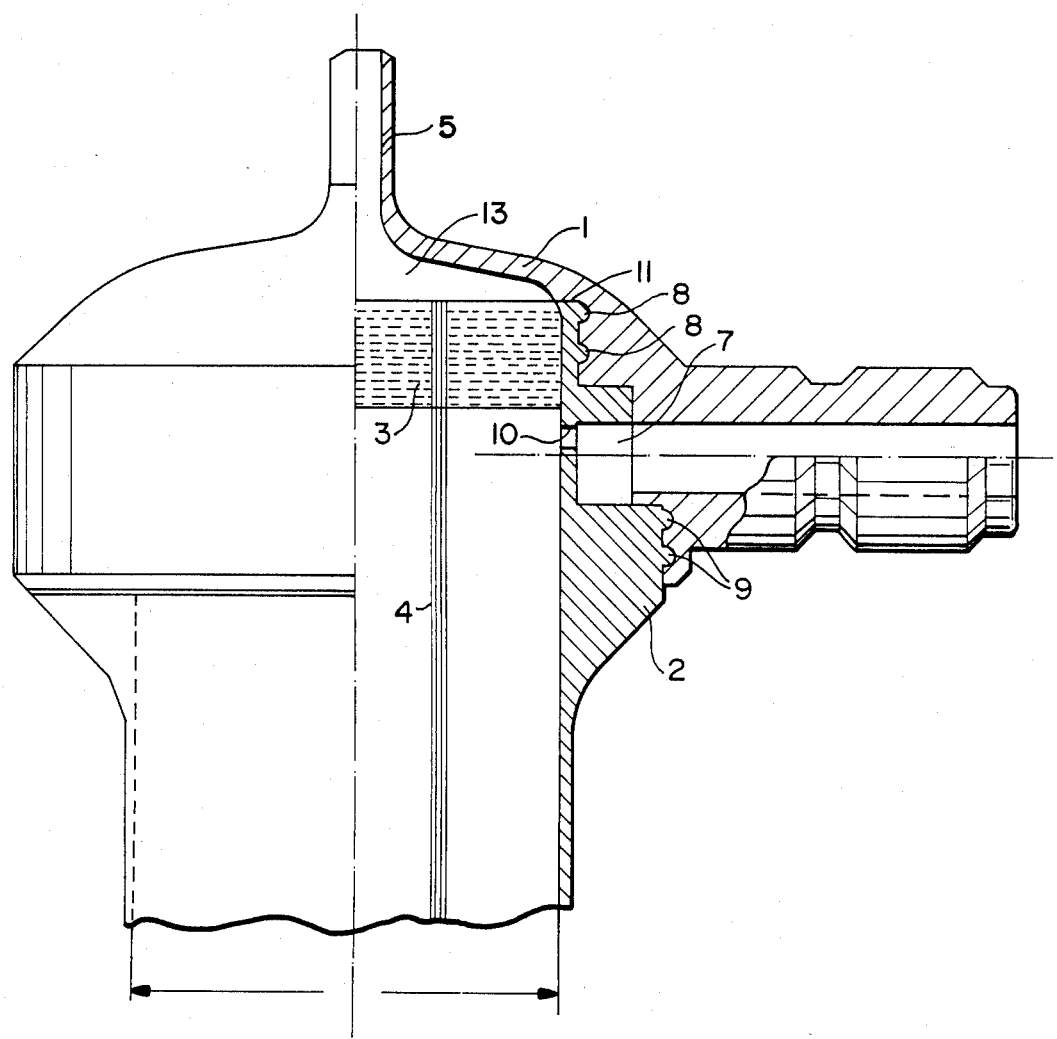
FIGS. 1-5, specific embodiments of the ends of the tubular body and of the caps of units for effecting mass and/or heat transfer according to the invention.

FIG. 1 shows one end of an apparatus for effecting mass and/or heat transfer according to the invention. The cap is designated 1 and the substantially tubular body is designated 2. Individual hollow filaments 4 of the bundle of hollow filaments are depicted. The ends of the hollow filaments 4 are embedded in a sealing compound 3. The cap 1 has two connecting branches 5, 6. The connecting branch 5 leads to the first distributor chamber 13, which is disposed on the end face, while the connecting branch 6 leads to the outside jacket of the substantially tubular body 2. The bosses or bulges 8, 9 may function as screw caps or snap-on caps. At least one port 10 leads from the second distributor chamber 7 radially to the interior of the cylindrical body so that the second medium, which is introduced through the connecting branch 6, is passed radially inwardly between the individual hollow filaments 4. The distributor chamber 7 may be designed as an annular duct. The annular duct may have the same cross section everywhere along the circumference, the ports 10 distributed along the circumference preferably having a gradually larger diameter the farther they are located from the connecting branch. The ports may also have the same diameter, the distance between the individual ports becoming gradually smaller the farther they are from the connecting branch 6. The cross-sectional area of the circumferential second distributor chamber 7 may also become gradually smaller with increasing distance from the connecting branch 6. As a result of these steps, alone or in combination of two or all three together, the second medium can be impacted uniformly upon the circumference of the bundle of hollow filaments. If the other end of the apparatus for effecting mass and/or heat transfer is designed in the same manner, uniform removal of the second medium, which is effected radially outwardly along the circumference of the bundle of hollow filaments, will also be assured.

A pointed boss 11 extending all the way around may be provided on the inside of the cap 1 to seal off the first distributor chamber 13, said boss entering the sealing compound 3 when the cap 1 is put in place. This shall occur in the area of the sealing compound in which there are no hollow filaments. Therefore, a small intervening space filled with sealing compound is provided between the circumference of the bundle of hollow filaments and the inside wall of the tubular body 2.

As a rule, to seal off the second distributor chamber from the outside, the bosses 9 are sufficient. However, the cap may also be tightly placed on the outside wall of the substantially tubular body with a sealing compound or seal ring, or by bonding, welding, etc.

Figure 2:
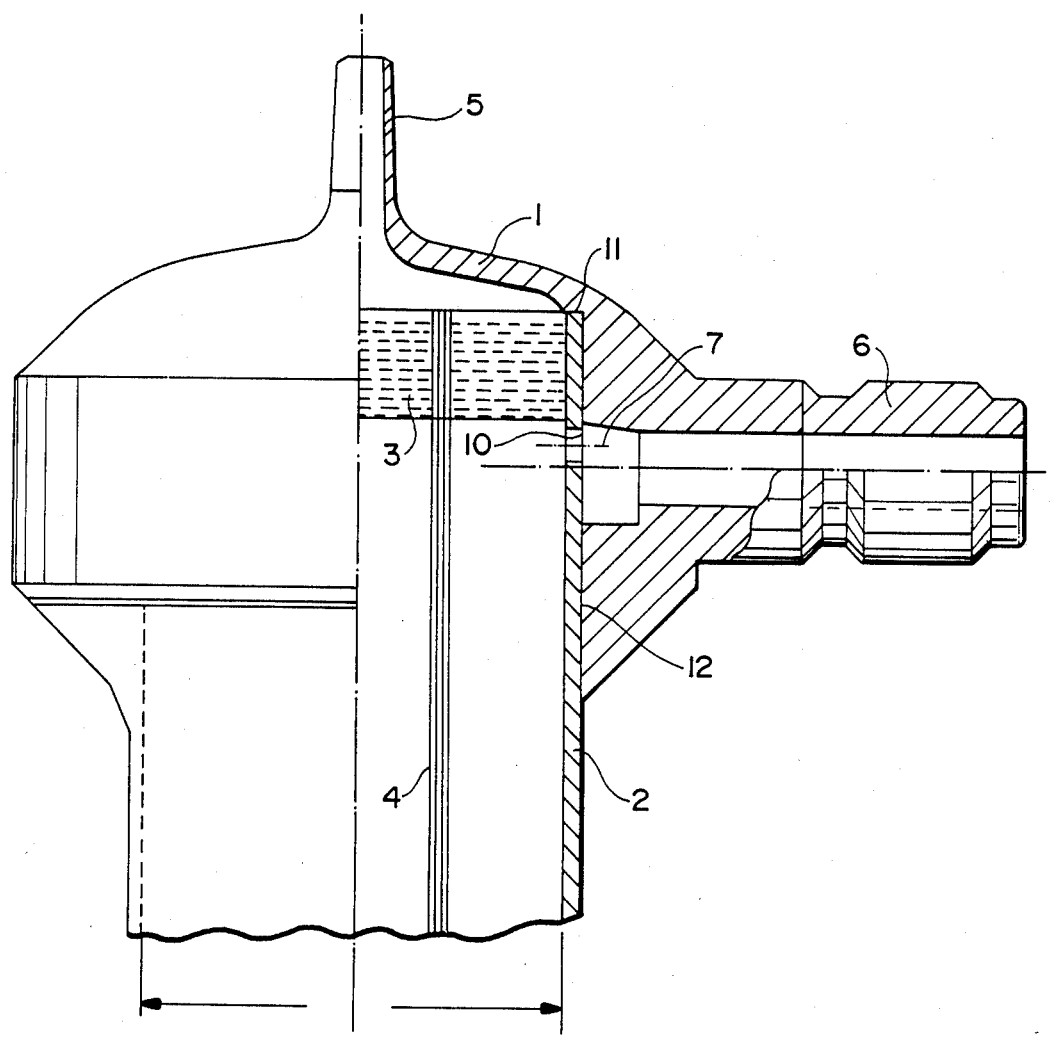

A particularly simple embodiment is shown in FIG. 2, where the cap 1 is permanently joined to the tubular body 2. In the embodiment shown in FIG. 2, the cap 1 may be bonded, welded, etc. to the tubular body 2 in the area 12.

Figure 3:
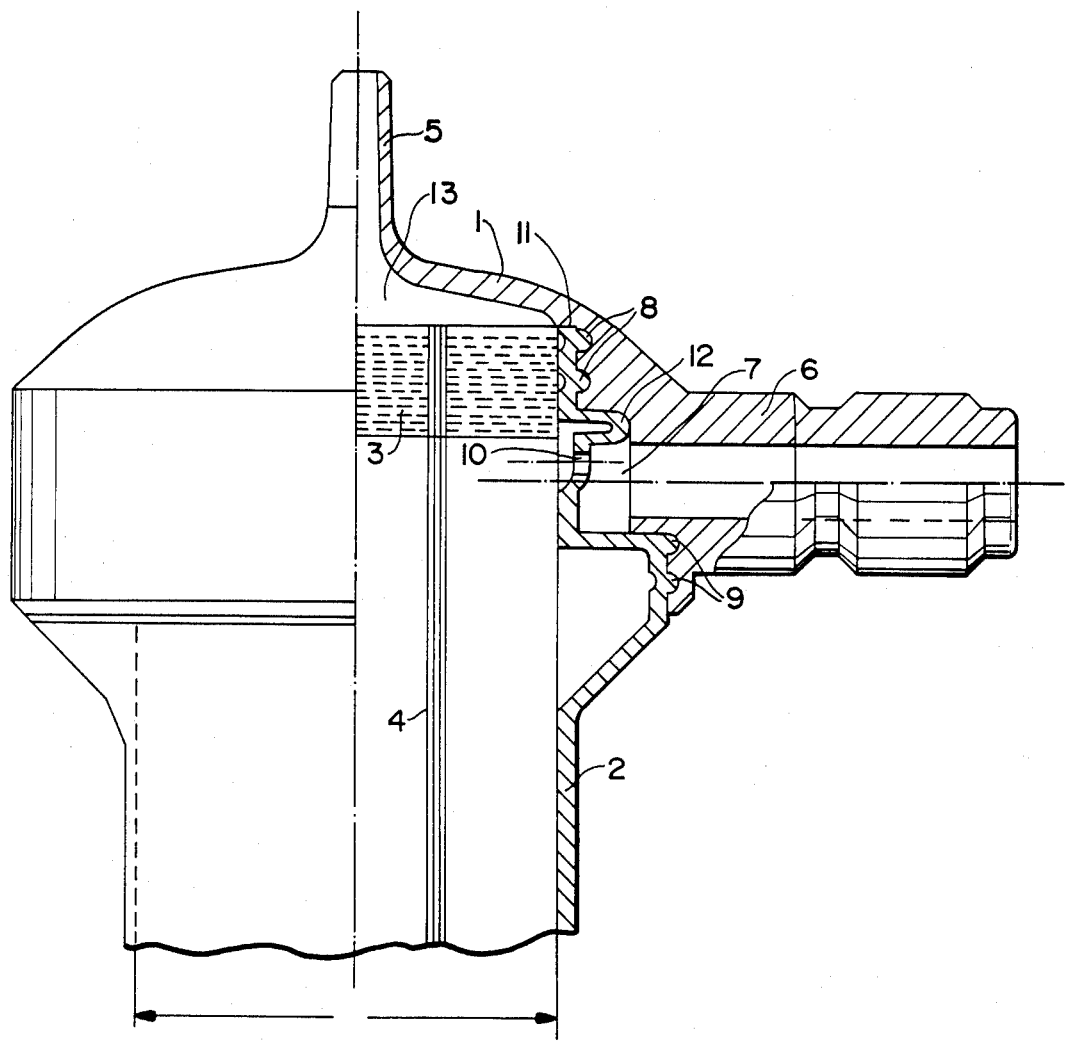

FIG. 3 shows another form of sealing between the individual distributor chambers 7, 13. Here, the tubular body 2 is formed as a (flexible) bellows 12, which, after the cap has been slipped on and has snapped into the bosses 8 and 9, is pressed against the cap, resulting in a particularly effective seal.

Figure 4:
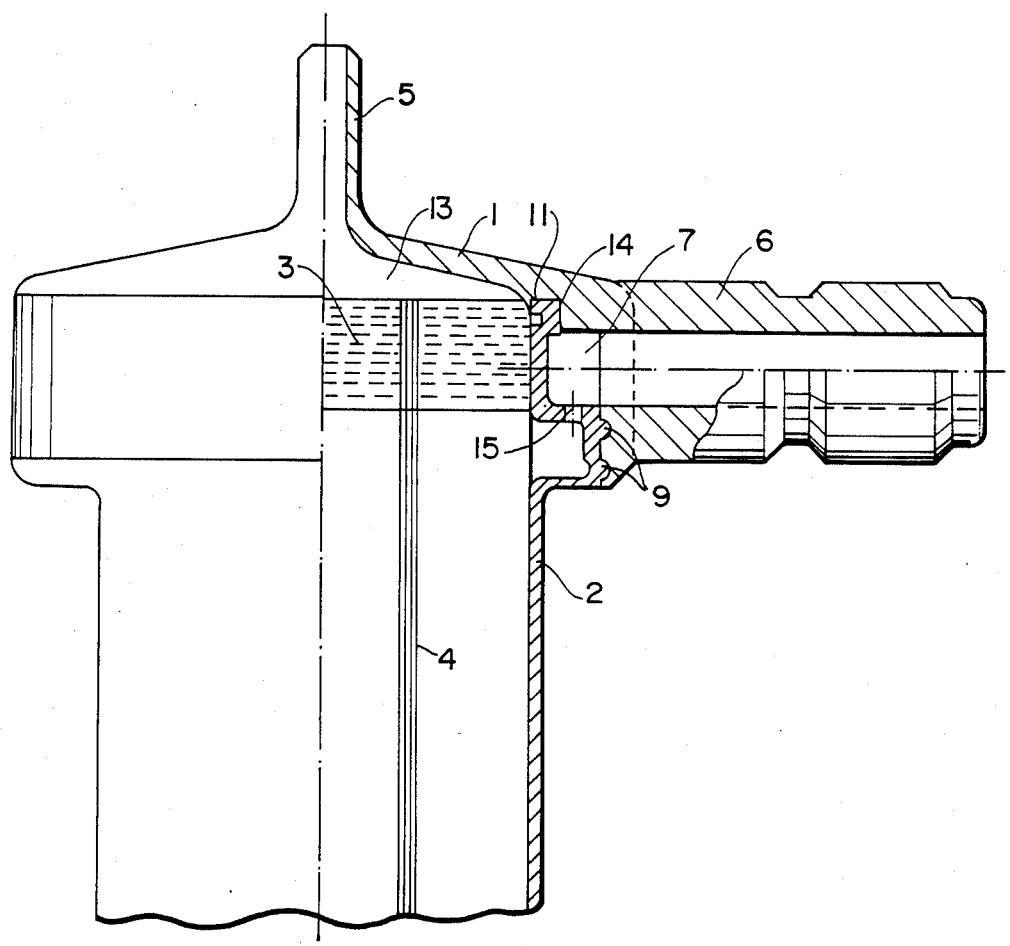

FIG. 4 shows that the sealing lip, formed as a folding bellows 14, may form the end of the tubular body. FIG. 4 also shows how the end portion of the tubular body can be formed such as to enable the ports 15 to pass through the wall in an axial direction.

Figure 5:
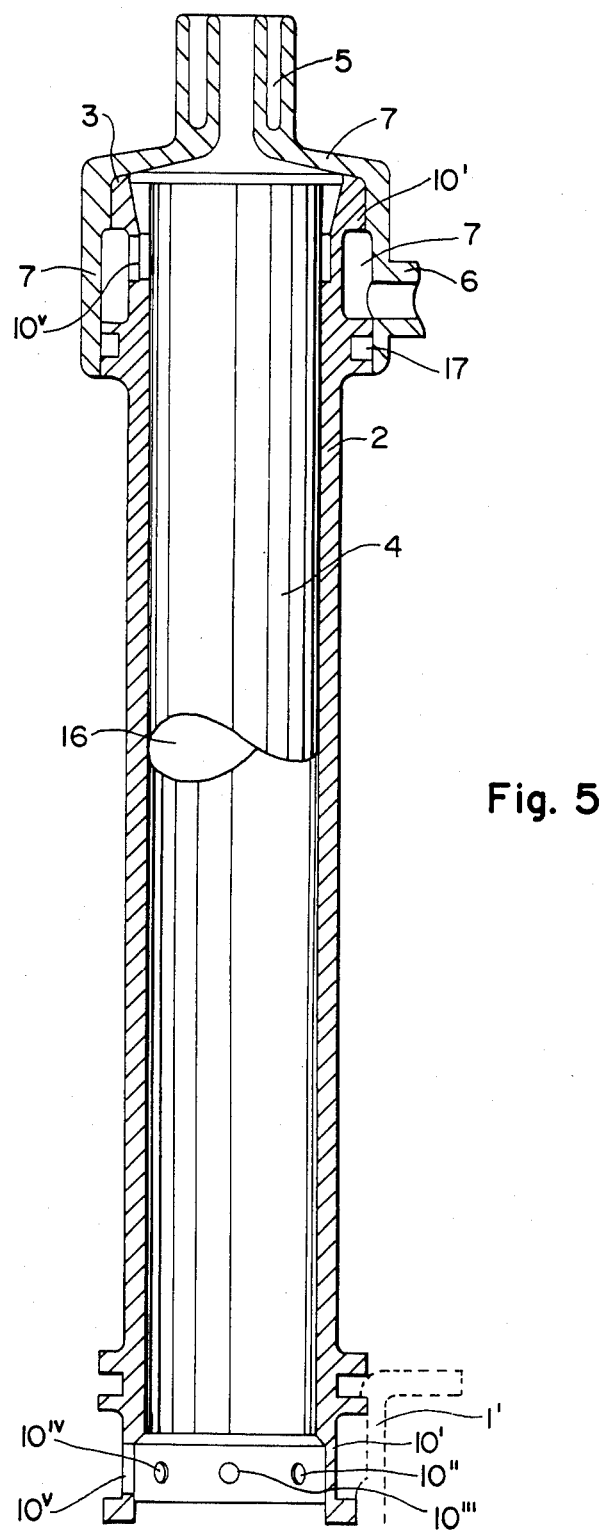

FIG. 5 shows another embodiment of an apparatus for effecting mass and/or heat transfer of the invention. Here, the sealing compound 3 is located in a conical structure of the inside wall of the tubular body 2. The cross-sectional areas of the ports are of different sizes, such that the cross-sectional areas 10', 10'', 10''', 10'$^{IV}$ and 10$^V$ increase with the distance from the connecting branch 5. If the apparatus effecting mass and/or heat transfer of the invention is manufactured by centrifugal casting, the port 10$^V$ can be used for introducing the sealing compound, e.g., polyurethane. In its cross-sectional dimension, the bundle of hollow filaments 16 with the support element extends advantageously over the entire inside cross section of the tubular body 2. The sealing between the cap and the tubular body may also be effected with O-rings 17. The cap can also be formed as a snap-on cap 1'. These constructions can be provided alone or in combination on the apparatus for effecting mass and/or heat transfer according to the invention.

Figure 6:
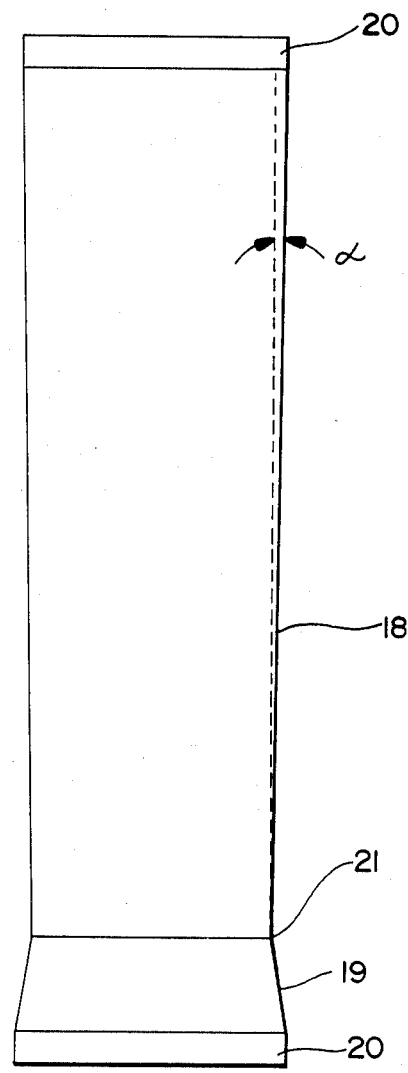
FIG. 6, a specific embodiment of the inside wall of the tubular body.

FIG. 6 shows the form of the inside wall of the housing. Here, in essence, the interior 18 widens conically from one end area 21 to the other end area 20. The conicity is defined by α (approximately 0.5°–1°). Another conicity 19 in one end area may, but need not be, provided. A funnel may, for example, be provided when inserting or sucking in the bundle of hollow filaments on the side with the smaller cross section (19/21). Conically widening the interior will prevent the external hollow filaments of the bundle from coming into contact with the wall of the tubular body and thus from becoming bent. The end pieces 20 are slightly enlarged to receive the sealing compound.

Figure 7:
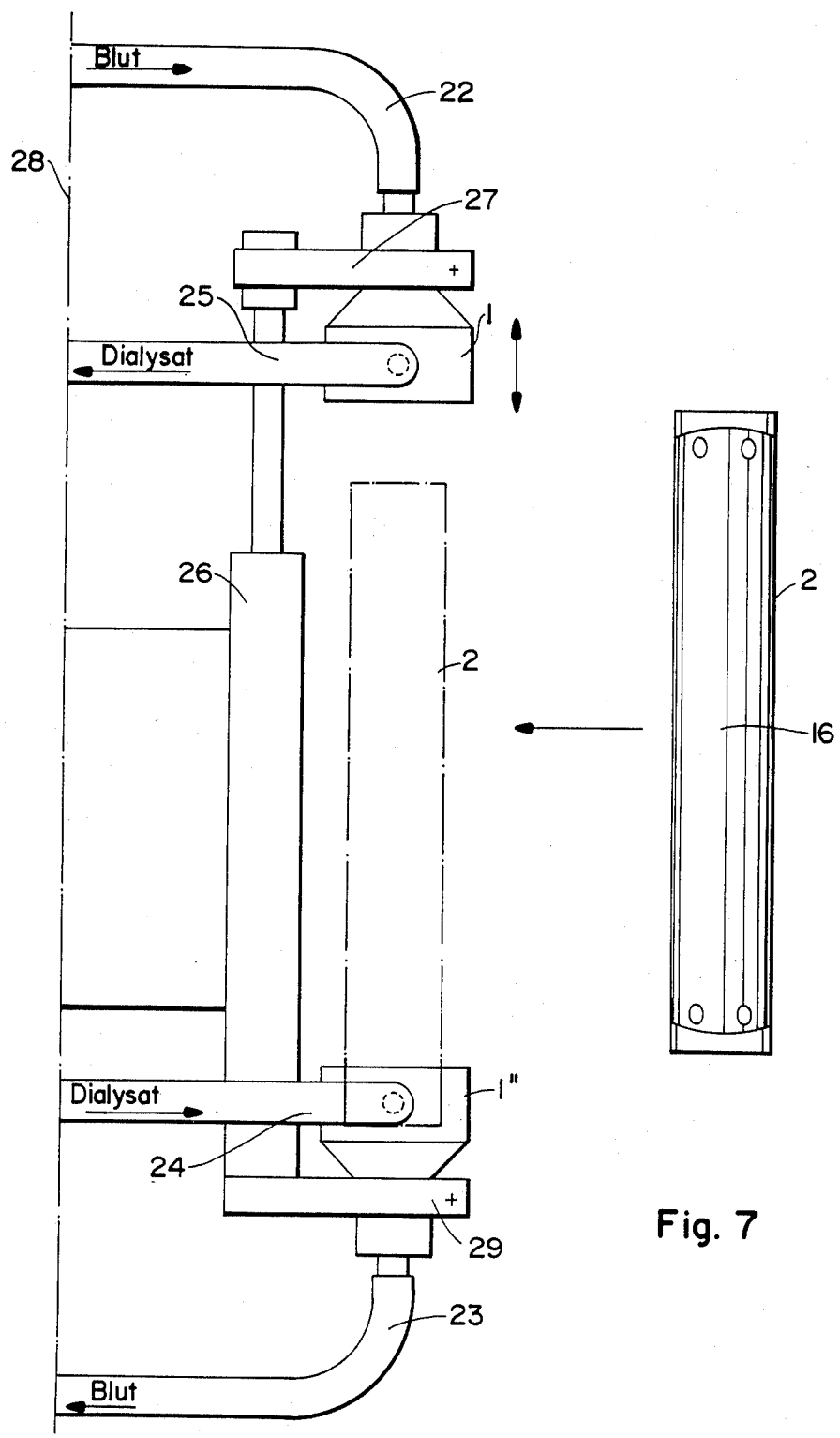
FIG. 7, a system for application of the apparatus for effecting mass and/or heat transfer according to the invention.

FIG. 7 shows a particularly advantageous system for application of the apparatus for effecting mass and/or heat transfer according to the invention. Here, the transfer units are used, for example, in a dialysis system, which is not shown in the drawing and which is placed next to the line of separation 28. This system also includes connecting hoses (or tubes) 22, 23, 24, 25 of blood inflow (22), blood outflow (23), dialyzate inflow (24), and dialyzate outflow (25), as well as a pneumatic cylinder 26, over the holders 27, 29 of which the caps 1, 1'' form a unit with the pneumatic cylinder. In this embodiment, the caps of the transfer apparatus are a constituent part of the dialysis system. Only the tubular body 2 with the bundle of hollow filaments 16 is used as a disposable item. The cap 1'' is fixedly mounted by means of the holder 29, while the cap 1 is placed to move axially by means of the pneumatic cylinder 26. When the cartridge (tubular body 2 with bundle of hollow filaments 16) is replaced, the pneumatic cylinder is separated, the cartridge changed, after which the pneumatic cylinder is moved together again.

Figure 8:
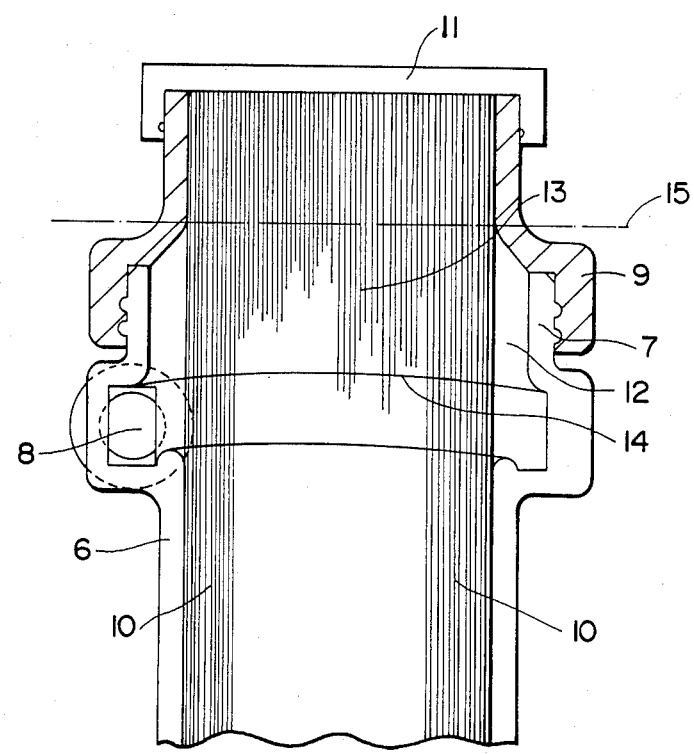
FIG. 8, in a simple schematic diagram, a method suitable for manufacturing apparatus of the invention.

A method for manufacturing an apparatus of the invention will be discussed with reference to FIG. 8. Here, only one end 6 of the housing is shown, which is slightly enlarged on the end 7. Between the housing enlargement 7 and the housing 6, there is an inlet or outlet 8, which, by way of example, is formed in the housing as a spiral. An annular body 9, which is attached or screwed onto the enlarged housing end 7, tapers at its free end down to the desired cross section of the bundle of hollow filaments.

In the example shown, the bundle of hollow filaments 10 is to be embedded by centrifugal casting. To this end, the annular body 9 must be sealed fluid-tightly with a cap 11. The sealing compound can be introduced through the inlet 8. Sealing compound can be injected until it fills up the intervening space 13 as far as the line 14. Once the sealing compound has set, the annular body 9 with the cap 11 can be removed. The embedded bundle is then cut off in the area of the enlargement, e.g., along the line 15.

To insert the bundle of hollow filaments into the housing 6 provided with the annular body 9, a vacuum can be produced in the housing 6, causing the bundle of hollow filaments to be sucked into the housing. If fluid is still contained in the individual hollow filaments, due to manufacturing procedures, this liquid can be drawn off the hollow filaments by the vacuum.

Baffles, e.g., flow resistors, can also be incorporated into the sealing compound, so that during subsequent operation of the module, the fluid flowing through the inlet or outlet will be effectively carried to the contour of the sealing compound (line 14).

Figure 9:
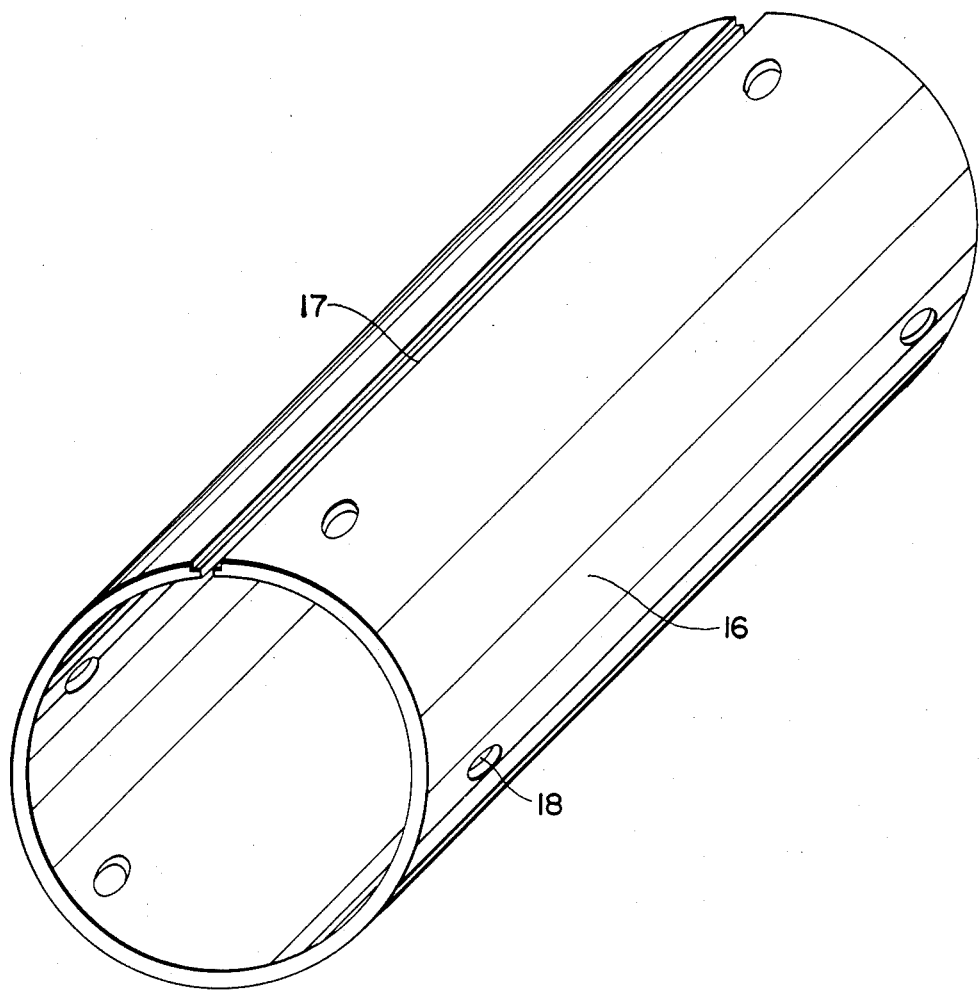
FIGS. 9-11, in a simple schematic diagram, another method suitable for manufacturing apparatus of the invention.
Figures 10, 11:
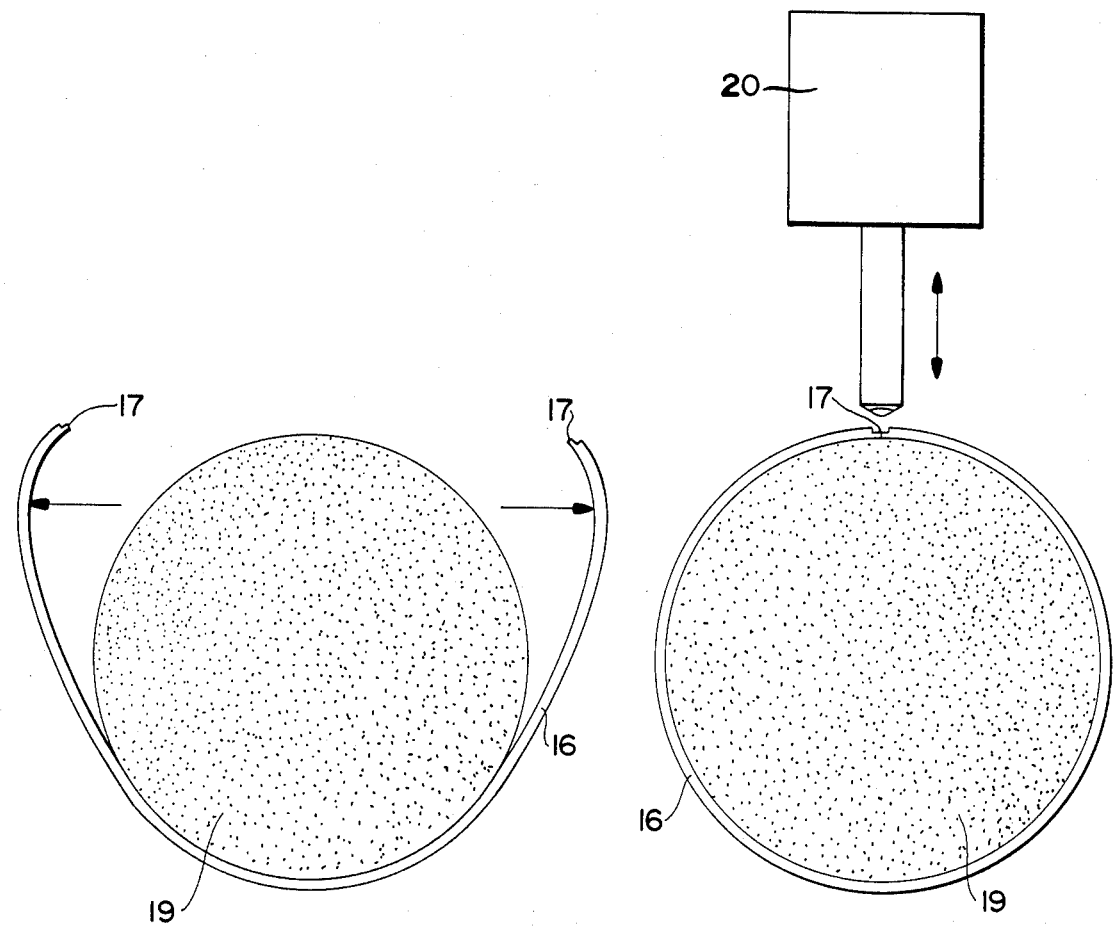

FIGS. 9–11 show another method for manufacturing apparatus of the invention. Element 16 is a tube which is axially split along the line 17. The openings 18 serve to supply or remove transfer media. The schematically illustrated bundle of hollow filaments 19 is inserted into the bent-up tube 16 (of FIG. 10). Then, as shown in FIG. 11, the tube is put together again and joined at the line of separation 17, e.g. by bonding or welding, or by means of additionally mounted mechanical aids.

One closing cap is attached to each end of the sealed tube. Preferably, this closing cap includes devices for supplying and removing the transfer media which shall flow around and/or through the hollow filaments.

Figure 12:
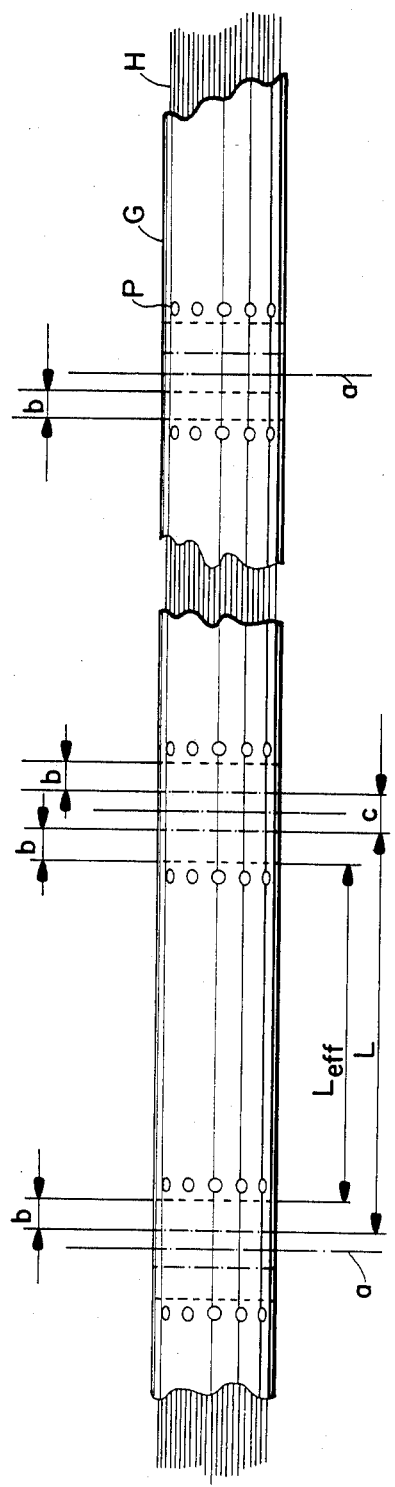
FIGS. 12 and 13, in simple schematic diagram, another method suitable for manufacturing apparatus of the invention.

FIG. 12 shows the main features of yet another method for manufacturing apparatus of the invention. Into the multiple housing G, which has a length many times that of the finished transfer apparatus, a bundle of hollow filaments H of the same length is inserted. The multiple housing G has has in the areas b, provided as end sections of the housing, wall openings P for the supply and removal of transfer media. In the areas c, the multiple housing G with the bundle of hollow filaments H located therein is ripped open. Then, the end sections of the hollow filaments in the areas between the cutting points c and the wall openings P are sealed with a sealing compound. Thereafter, by cutting off a disk-shaped portion of the sealing compound with the end sections of hollow filaments embedded therein, the transfer units are cut to the desired length L, and the ends of the hollow filaments (that have not been embedded) are laid bare. The effective length of the hollow filaments that brings about the mass and/or heat transfer is $L_{eff}$. In this way, two to thirty, or even more, transfer units can be manufactured very inexpensively from one bundle of hollow filaments with a transfer surface of, e.g., 0.5 to 5 m$^2$.

Figure 13:
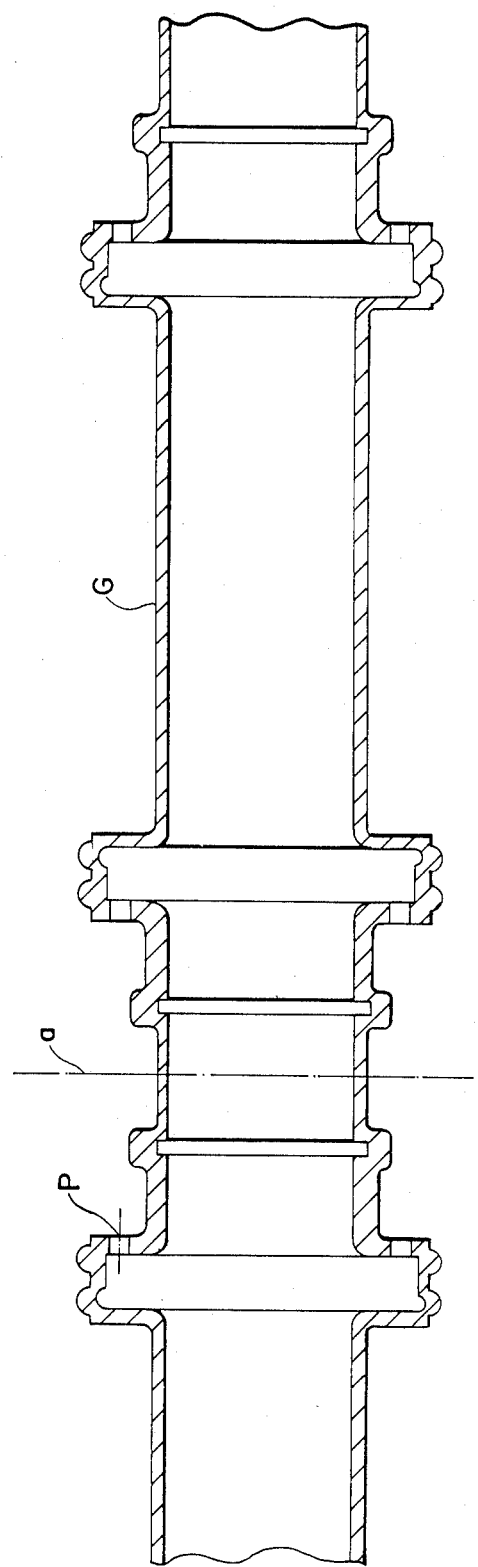

The multiple housing G need not be formed as a substantially smooth cylinder, but, as shown in FIG. 13, it can also be manufactured by a blow-molding technique and can have an outside contour that, for example, facilitates the mounting of the cap and/or that already have the distributor chamber located on the outside jacket with the ports P. Here, too, the separation of the multiple housing G with the hollow filaments (not shown) located therein, the subsequent encapsulation of the ends of the hollow filaments and the laying bare of the ends of the hollow filaments that have not been embedded are all effected as described with reference to FIG. 12.

Figure 14:
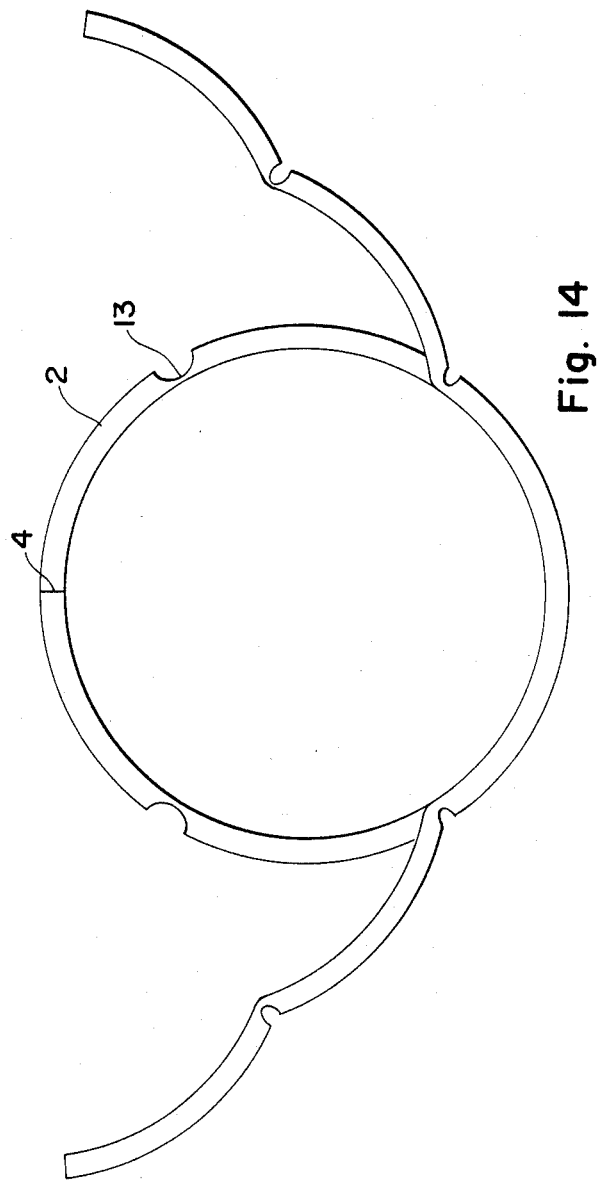
FIG. 14, a deployable housing, shown in its flipped-open and closed states.

FIG. 14 shows a deployable tubular housing 2 shown in cross section, in both its flipped-open and closed states. The housing 2 has a total of four groove-like indentations 13 extending longitudinally throughout the length of the housing 2. As a result, the wall thickness of the housing 2 at these points becomes substantially less than in the other areas, so that if a non-brittle material is used for the housing 2, a reversible, optionally flexibly, elastic deformation of the housing 2 is possible at these points. This substantially simplifies the flipping open and shut of the housing. In the flipped-open state, the hollow filaments can be inserted by hand or by mechanical means. After the hollow filaments have been inserted, the housing 2 can once again be closed shut, forming the joint 4. To prevent the housing 2 from flipping open again after insertion of the hollow filaments and after the housing has been closed, positive or form-fitting closing means, e.g., an adhesive tape, can be provided.

Figure 15:
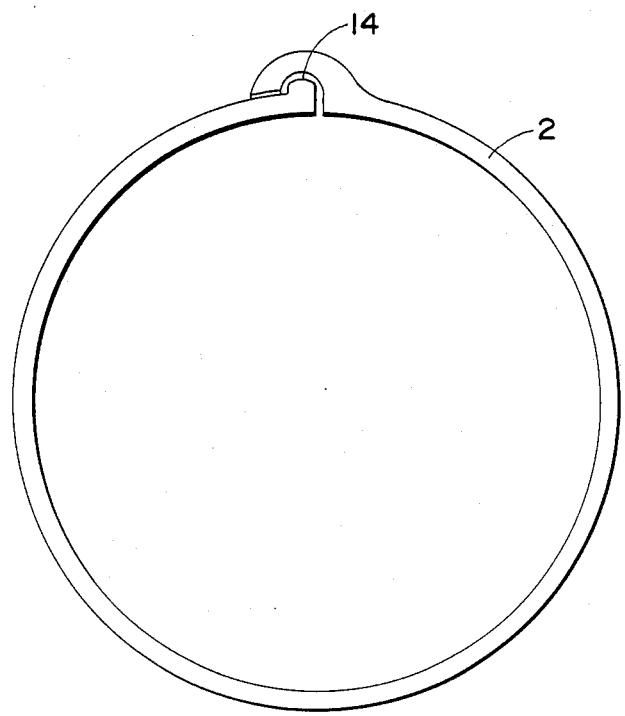
FIG. 15, a housing with a snap-on cap, shown in its closed state.

FIG. 15 shows an example of a form-fitting snap-on clasp 14, the function of which is readily apparent to the observer and therefore need not be explained in detail. The snap-on mechanism 14 can extend over the entire length or only over short sections of the deployable tubular housing 2.

Figure 16:
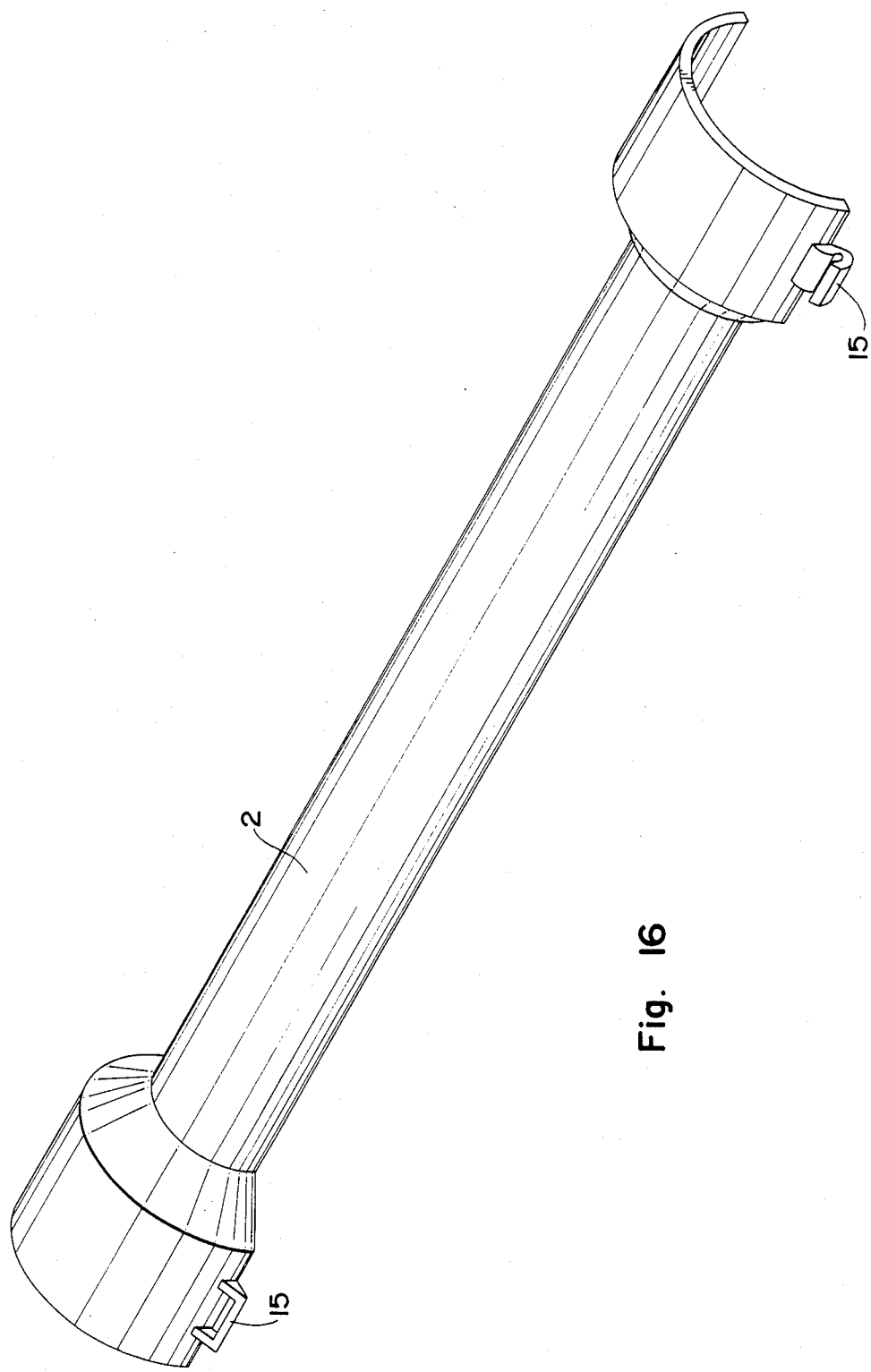
FIG. 16, a housing with snap hinges.

FIG. 16 shows one-half of a housing 2, which can be joined to its other half by snap hinges 15, so that it can be flipped open. Hence, in its closed state, this housing 2 has two joints.

Figure 17:
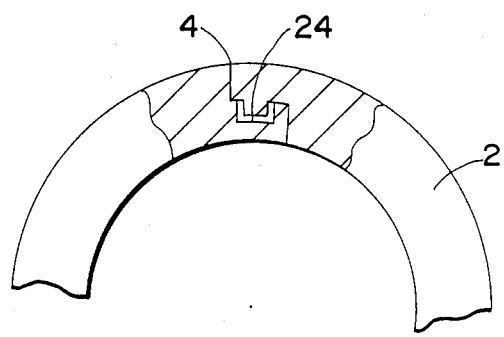
FIG. 17, another embodiment of a closing device of a deployable housing.

FIG. 17 is a cross-sectional view of a pushbutton-type closing device 24 for a deployable housing 2. This closing device has the advantage that the outside contour of the housing 2 has not been altered as, for instance, in the embodiment of FIG. 15. The joint 4 is formed in this closing device as well.

According to the invention, the deployable housing can be sealed by bonding or welding.

What is claimed:

1. An apparatus for effecting mass and/or heat transfer, comprising a bundle of hollow filaments of substantially equal length having ends which are embedded in a sealing compound, and a substantially cylindrical housing comprising a substantially tubular body and a cap at each of two end areas of said housing with connecting branches in the caps for supplying and removing at least two media, a first medium being guided through the hollow filaments and a second medium being guided radially inwardly at a flow inlet of the housing and radially outwardly at a flow outlet of the housing, each of the caps forming with the respective end of the substantially tubular body two distributor chambers sealingly separated from one another, a first distributor chamber being disposed on an end face of the tubular body and a second distributor chamber being disposed on an outer jacket of the tubular body, the outer jacket of the tubular body having at least one port in the area of the second distributor chamber.

2. An apparatus as defined in claim 1, wherein the second distributor chamber is located circumferentially about the outer jacket of the tubular body, a plurality of ports being provided along the circumference of the outer jacket.

3. An apparatus as defined in claim 1, wherein an inside wall of the ends of the tubular body has in the area of the sealing compound a cross-sectional area enlarged such that between an outside circumference of the bundle of hollow filaments and the inside wall of the tubular body there is an intervening space about 0.2–1.5 mm wide filled with said sealing compound.

4. An apparatus as defined in claim 1, wherein sides of said bundle are substantially parallel and the interior of the tubular body widens conically from one end area to the other area.

5. An apparatus as defined in claim 1, wherein the caps and the substantially tubular body are composed of different materials, and the material of the tubular body has substantially the same linear-change characteristics as the bundle of hollow filaments.

6. An apparatus as defined in claim 1, wherein the two caps are fixed in a dialysis system, and wherein at least one cap can be moved axially and the tubular body with the bundle of hollow filaments can be replaced.

* * * * *